United States Patent [19]

Nakamura

[11] Patent Number: 5,484,968
[45] Date of Patent: Jan. 16, 1996

[54] INTERFERENCE DEVICE FOR DISCRIMINATING A CERTAIN OSCILLATION

[75] Inventor: Takaji Nakamura, Yamaguchi, Japan

[73] Assignee: Omron Corporation, Kyoto, Japan

[21] Appl. No.: 264,201

[22] Filed: Jun. 22, 1994

[30] Foreign Application Priority Data

Jun. 30, 1993 [JP] Japan .................................. 5-160604

[51] Int. Cl.⁶ ..................................................... G01V 1/16
[52] U.S. Cl. ......................... 181/122; 181/401; 340/690; 33/365; 73/649; 73/784
[58] Field of Search ............................ 340/690; 181/401, 181/122; 33/365; 73/649, 784

[56] References Cited

U.S. PATENT DOCUMENTS

| | | | |
|---|---|---|---|
| 4,214,238 | 7/1980 | Adams et al. | 340/690 |
| 4,998,601 | 3/1991 | Suzuki | 187/107 |
| 5,373,486 | 12/1994 | Dowla et al. | 367/135 |
| 5,396,223 | 3/1995 | Iwabuchi et al. | 340/690 |

FOREIGN PATENT DOCUMENTS 2695527  3/1994  France .

OTHER PUBLICATIONS

"Toward an Automatic System for Earthquake Investigation," Di Stefano et al., *Proceedings of Tencon 87*, vol. 2 of 3, Aug. 25, 1987, Seoul, Korea, pp. 492–496.

"Seismic Event Interpretation Using Self-Organizing Neural Networks," Maurer et al., *Proceedings SPIE, Applications of Artificial Neural Networks II*, vol. 1709, Apr. 1992, Orlando, Fla., pp. 950–958.

"Array Detectors for Random Signals in Noise," Kassam et al., *IEEE Transactions on Sonics and Ultrasonics*, vol. SU-23, No. 2, Mar. 1976, New York, pp. 107–112.

European Search Report completed Jan. 5, 1995 with Communication dated Jan. 27, 1995.

*Proceedings of Tencon 87*, "Towards an automatic system for earthquake investigation", Di Stefano et al., 25 Aug. 1987, pp. 492–496.

*Proceedings of SPIE, Applications Of Artificial Neural Networks III*, vol. 1709, "Seismic event interpretation . . . ", Maurer et al., pp. 950–958, Apr. 1992.

*IEEE Transactions on Sonics and Ultrasonics*, vol SU-23, #2, Mar. 1976, "Array detectors for random signal in noise", Kassam et al., pp. 107–112.

*Primary Examiner*—J. Woodrow Eldred
*Attorney, Agent, or Firm*—Fish & Richardson

[57] ABSTRACT

An inference device for discriminating an earthquake includes an ON/OFF signal generating means for generating an ON/OFF signal corresponding to an oscillatory wave, a characteristic parameter extracting means for extracting at least one of three characteristic parameters consisting of an ON period, an ON time sum total and a maximum ON time value based on the generated ON/OFF signal, and an inference means for inferring for each ON period based on the extracted characteristic parameter whether or not an earthquake happens.

20 Claims, 5 Drawing Sheets

OSCILLATION

RESPONSE

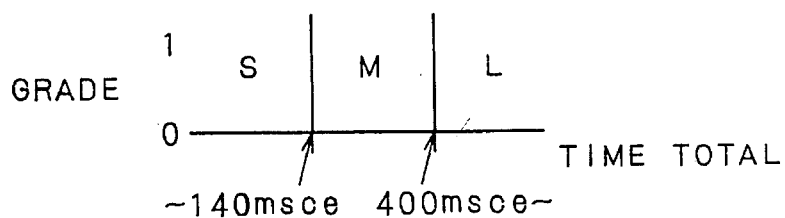
FIG. 3A  ON-TOTAL
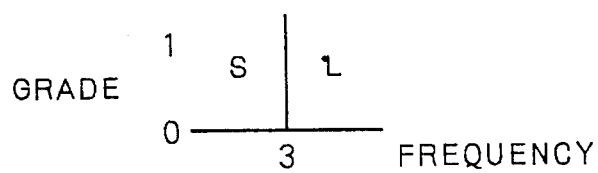
FIG. 3B  ON-SHORT
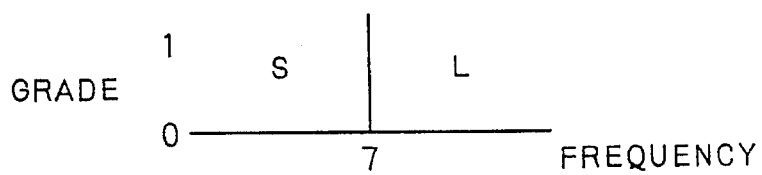
FIG. 3C  ON-MED.
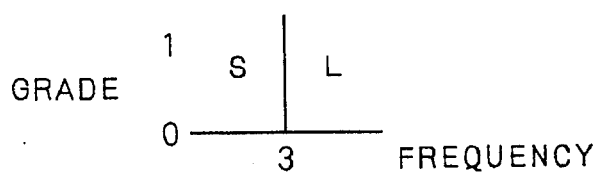
FIG. 3D  ON-LONG
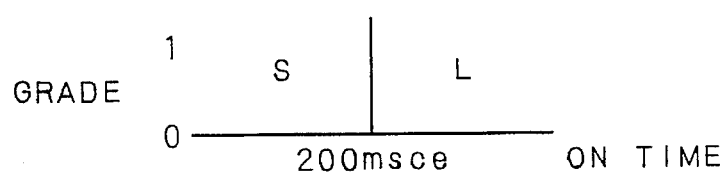
FIG. 3E  ON-MAX.

FIG. 4

| PARAM.<br>RULE | ON-TOTAL | | | FREQ.<br>SHORT | | FREQ.<br>MED. | | FREQ.<br>LONG | | ON-MAX. | |
|---|---|---|---|---|---|---|---|---|---|---|---|
| | S | M | L | S | L | S | L | S | L | S | L |
| 1 | ☆ | | | ☆ | | | ☆ | | | | |
| 2 | ☆ | | | ☆ | | | | | ☆ | | |
| 3 | | ☆ | | | | ☆ | | | | | |
| 4 | | ☆ | | ☆ | | | ☆ | | | | |
| 5 | | ☆ | | ☆ | | | | | ☆ | | |
| 6 | | | ☆ | | | | | | ☆ | | |
| 7 | | | | | ☆ | | ☆ | | | | ☆ |

FIG. 6A
SENSOR
FIG. 6B
SAMPLING
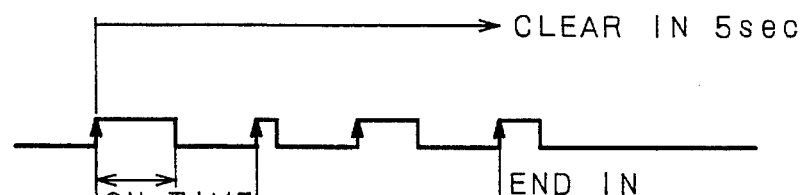
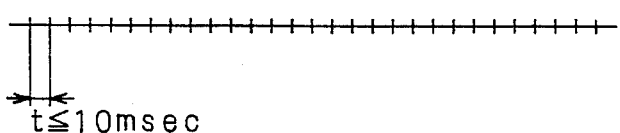

INTERFERENCE DEVICE FOR DISCRIMINATING A CERTAIN OSCILLATION

BACKGROUND OF THE INVENTION

1. Field of the Invention

This invention relates to an inference device for discriminating a predetermined shock, and more particularly to an improved device for discriminating a certain oscillation which is suitable for a unit to be installed within a gas meter for home use so as to cut off the supply of gas on occurrence of the earthquake.

2. Discussion of the Related Art

There is well known a device for measuring ON/OFF signals generated from a sensor or a seismoscope housed within a gas meter for a predetermined time period and for detecting an certain oscillation such as an earthquake when the measured signals reach a predetermined condition.

Such a conventional device is designed to store ON/OFF signal data generated from the seismoscope for the predetermined time period, for example, three seconds, and to execute such discrimination based on the stored data, so that the discrimination cannot be initiated until the predetermined time period elapse for data storage.

SUMMARY OF THE INVENTION

It is, therefore, a primary object of this invention to provide an inference device for discriminating a shock or an earthquake at a high speed with reducing erroneous discrimination.

According to this invention, there is provided an inference device for discriminating an earthquake which includes an ON/OFF signal generating means for generating an ON/OFF signal corresponding to an oscillatory wave, a characteristic parameter extracting means for extracting at least one of three characteristic parameters consisting of an ON period, an ON time sum total and a maximum ON time value based on the generated ON/OFF signal, and an inference means for inferring for each ON period based on the extracted characteristic parameters whether or not an earthquake happens.

Thus, the device infers the existence of an earthquake based on at least one of the three parameters of an ON period, an ON time sum total and a maximum ON time value for each ON period, in other words, based on data generated from a time point when the first ON signal is applied for each entry of the ON signal, so that the inference by this device is executed at a higher speed than a conventional method in which discrimination is executed after storing ON/OFF signal data for a predetermined time period. Moreover, the device processing the ON period corresponding to an oscillatory period as a characteristic parameter can fairly decrease erroneous discrimination by other shock than earthquake.

BRIEF DESCRIPTION OF THE DRAWINGS

A better understanding of this invention may be had from a consideration of the following detailed description taken in conjunction with the accompanying drawings in which:

FIGS. 3A to 3E show membership functions about the respective characteristic parameters;

FIG. 4 is a table showing inference rules;

FIGS. 6A and 6B show a timing chart for explaining the operation.

DETAILED DESCRIPTION OF THE INVENTION

Figure 1:
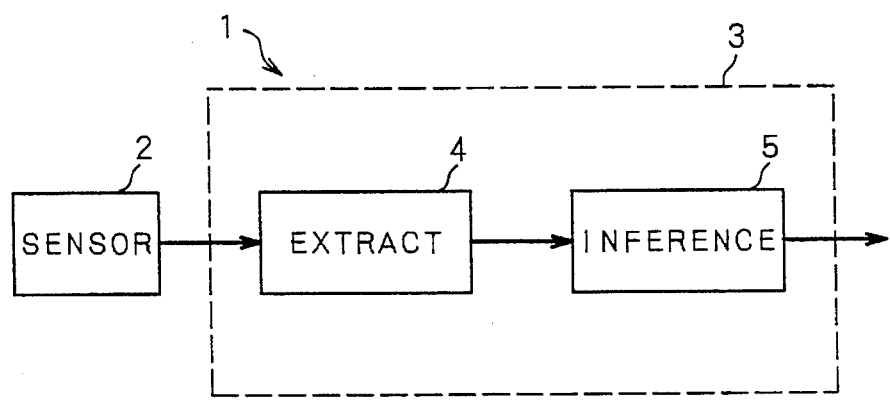
FIG. 1 is a schematic block diagram of an earthquake discrimination inference device as a preferred embodiment of this invention.

Referring, now, to FIG. 1, there is shown a schematic block diagram of an earthquake discrimination inference device 1 as a preferred embodiment according to this invention, which includes a scismoscope or a sensor 2 for generating an ON/OFF signal in response to a shock representing an ON/OFF signal generating means and a microcomputer 3. The microcomputer includes a characteristic parameter extracting section 4 for extracting three characteristic parameters of an ON period, an ON time sum total and a maximum ON time value, and an inference section 5 based on the characteristic parameters for inferring in a fuzzy logic for each ON period whether or not there exists any earthquake. The characteristic parameters are made by sampling data from a time point when the first ON signal is entered until a time point when an ON signal is subsequently entered, and such an inference is executed based on the corresponding characteristic parameters on the respective time points. The characteristic parameters are revised for each entry of an ON signal based on the data subsequently generated from the time point when the first ON signal is applied.

Figure 2A:
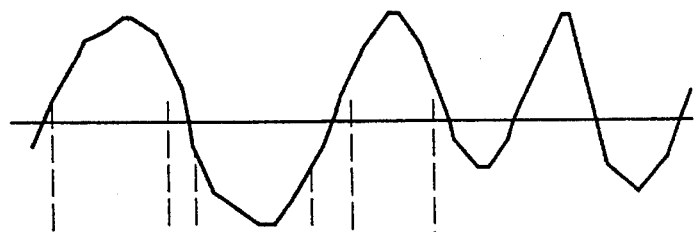
FIG. 2A is a wave form of an oscillation to be applied to the device.
Figure 2B:
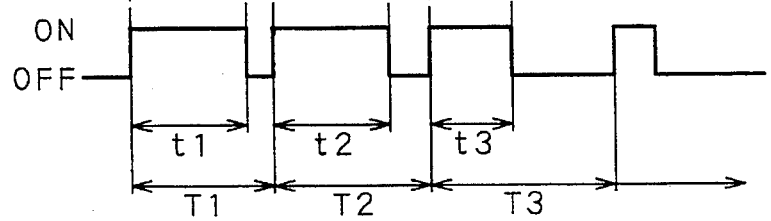
FIG. 2B is a response wave form of an output from a sensor of the device applied by the oscillation.

The sensor 2 generates an ON/OFF signal as shown in FIG. 2B according to a wave form of an oscillation as shown in FIG. 2A by defining an ON point when the wave form exceeds a predetermined threshold value.

The characteristic extracting section 4 extracts the three characteristic parameters of an ON period, an ON time sum total [ON time 1 "t1" | ON time 2 "t2"+ON time 3 "t3"+. . . ] and a maximum ON time value by sampling an ON/OFF signal generated from sensor 2 whenever an ON signal is applied. In this embodiment, the characteristic parameters are represented by occurrence frequencies of ON period (short, medium and long), and the following five characteristic parameters are extracted.
(1) ON time sum total
(2) a maximum ON time value
(3) occurrence frequency of a short ON period=occurrence times in an ON period shorter than 140 msec
(4) occurrence frequency of a medium ON period=occurrence times in an ON period of 140 msec or longer but shorter than 400 msec.
(5) occurrence frequency of a long ON period=occurrence times in an ON period of 400 msec or longer.

The extraction of the ON time sum total (sum total of ON time), the maximum ON time value and the occurrence frequency of an ON period as characteristic parameters is based on the reasons below.

The ON time sum total represents an index of a continuous time of oscillation, the ON time generated from the sensor may be a velocity larger than a predetermined acceleration, wherein the ON time sum total has correlation with oscillation energy to represent an index showing a magnitude of oscillation as expressed by the equation below.

B−[½]mV²[E:energy, m:mass, v:velocity]

E∝V²

The maximum ON time value represents a magnitude of tremor for a half period, and becomes a characteristic parameter because in an earthquake with a vertical shock, the continuous time of oscillation is rather short and the energy in a half period is large. The ON period generated from the sensor makes it possible to generally catch a frequency band (period band) larger than a predetermined acceleration.

The ON period is ½ of an oscillation period. Accordingly, a short ON period below 140 msec corresponds to a band in which an oscillation period is below 0.28 sec (frequency is 3.6 Hz or larger) and an earthquake wave is partially overlapped with a shock wave. A medium ON period of 140 msec or longer but shorter than 400 msec corresponds to a band in which an oscillation period is from 0.28 sec to 0.8 sec (frequency is 1.25 Hz to 3.5 Hz) and there exist the most prominent frequencies in an earthquake wave, which is a central frequency band. A long ON period of 400 msec or longer corresponds to a band in which an oscillation period is 0.8 sec (frequency=1.25 Hz) or longer, which is a band of a response of an earthquake wave on soft ground and of a response period (frequency) of a skyscraper.

Fussy inference based on such characteristic parameters will be described hereinafter.

FIGS. 3A to 3E show membership functions of the above-mentioned five characteristics parameters. FIG. 3A shows a membership function of an ON time sum total "ON-TOTAL" which is labeled with short "S", medium "M", and long "L". The label of short "S" corresponds to an ON time sum total shorter than 140 msec, the label of medium "M" corresponds to an ON time sum total of 140 msec or longer but shorter than 400 msec, and the label of long "L" corresponds to an ON time sum total of 400 msec or longer.

FIG. 3B shows a membership of occurrence frequency of a short ON period "ON-SHORT" which is labeled with two labels, small "S" and large "L". The small "S" corresponds to the occurrence frequency of three or smaller about a short ON period, and the large "L" corresponds to the occurrence frequency of four or larger about a short ON period.

FIG. 3C shows membership function of occurrence frequency of a medium ON period "ON-MED." which is labeled with two labels, small "S" and large "L". The small "L" corresponds to the occurrence frequecny seven or smaller about a medium ON period, and the large "L" corresponds to the occurrence frequency of eight or larger about a medium ON period.

FIG. 3D shows a membership function of occurrence frequency of a long ON period "ON-LONG" which is labeled with two labeled, small "S" and large "L". The small "S" corresponds to the occurrence frequency of three or smaller about a long ON period, and the large "L" corrspeonds to the occurrence frequency of four or larger about a long ON period.

FIG. 3E shows a membership function of occurrence frequency of a maximum ON time value "ON-MAX." which is labeled with two labels, short "S" and long "L". The short "S" corresponds to a maximum ON value below 200 msec, and the long "L" corresponds to a maximum ON time value of 200 msec or longer.

FIG. 4 is a table showing inference rules for discriminating an earthquake. The table consists of seven RULES 1 to 7, and parameters of an ON time sum total "ON-TOTAL " classified into short "S", medium "M" and long "L", an occurrence frequency of a short period "FREQ. SHORT" classified into small "S" and large "L", an occurrence frequency of a medium period "FREQ. MED." classified into small "S" and large "L", an occurrence frequency of a long period "FREQ. LONG" classified into small "S" and large "L", and a maximum ON time value "ON-MAX." classified into short "S" and long "L".

In this embodiment, it is discriminated by the following seven rules whether or not earthquake occurs:

RULE 1

IF an ON time sum total is short, an occurrence frequency of a short ON period is small and an occurrence frequency of a medium ON period is large, THEN earthquake.

RULE 2

IF an ON time sum total is short, an occurrence frequency of a short ON period is small and an occurrence frequency of a long ON period is large, THEN earthquake.

RULE 3

IF an On time sum total is medium and an occurrence frequency or a medium ON period is small, THEN earthquake.

RULE 4

IF an ON time sum total is medium, an occurrence frequency of a short ON period is small and an occurrence frequency is large, THEN earthquake.

RULE 5

IF an ON time sum total is medium, an occurrence frequency of a short ON period is small and an occurrence frequency of a long ON period is large, THEN earthquake.

RULE 6

IF an On time sum total is long and an occurrence frequency of a long ON period is large, THEN earthquake.

RULE 7

IF an occurrence frequency of a short ON period is large, an occurrence frequency of a medium ON period is large and a maximum ON time value is long, THEN earthquake.

Thus, when the antecedent is satisfied with conditions marked with ★ in the table of FIG. 4, the consequent makes "earthquake." In this embodiment, the grades of 1 or 0 obtained by the above-mentioned membership functions are operated by a logical product in accordance with the rules. Determination of "earthquake" is made when the result of logical product is "1", but determination of "non-earthquake" is made when the result is "0".

It will be described hereinafter what kind of earthquake is assumed to define these rules.

RULEs 1 and 2 are made to assume an earthquake generated on a relatively soft ground which is associated with shocks having a typical frequency component of an earthquake because an ON time sum total is short but an occurrence frequency of a medium ON period is large. A logical product with an occurrence frequency of a short ON period in small is employed to avoid erroneous discrimination.

RULE 3 is made to assume an earthquake with a vertical shock in which an occurrence frequency of a medium ON period is small and an ON time sum total is medium. This earthquake has a small frequency but its ON time sum total is medium, so that tremor per a unit period is large and danger.

RULEs 4 and 5 are made to assume a large earthquake having a relatively great distance seismic center in which its vibration period is between medium and long and its ON time sum total is about medium. The earthquake is supposed to be a dangerous earthquake having a long continuous time. In a great distance seismic center the tremor is lengthened by a magnitude of a reflected wave or tremor. A logical product with an occurrence frequency of a short ON period in small is employed to avoid erroneous discrimination.

RULE 6 is made to assume an earthquake on a soft ground or tremor in a skyscraper in which its ON time sum total is long and its occurrence frequency of long ON period is large. Accordingly, it is supposed to be tremor having great energy.

RULE 7 is made to assume an earthquake on a solid ground inviting heavy damage in which a tremor component of vibration is generated over broad range and its maximum ON time value is large, which is supposed to be a very big earthquake.

Figure 5:
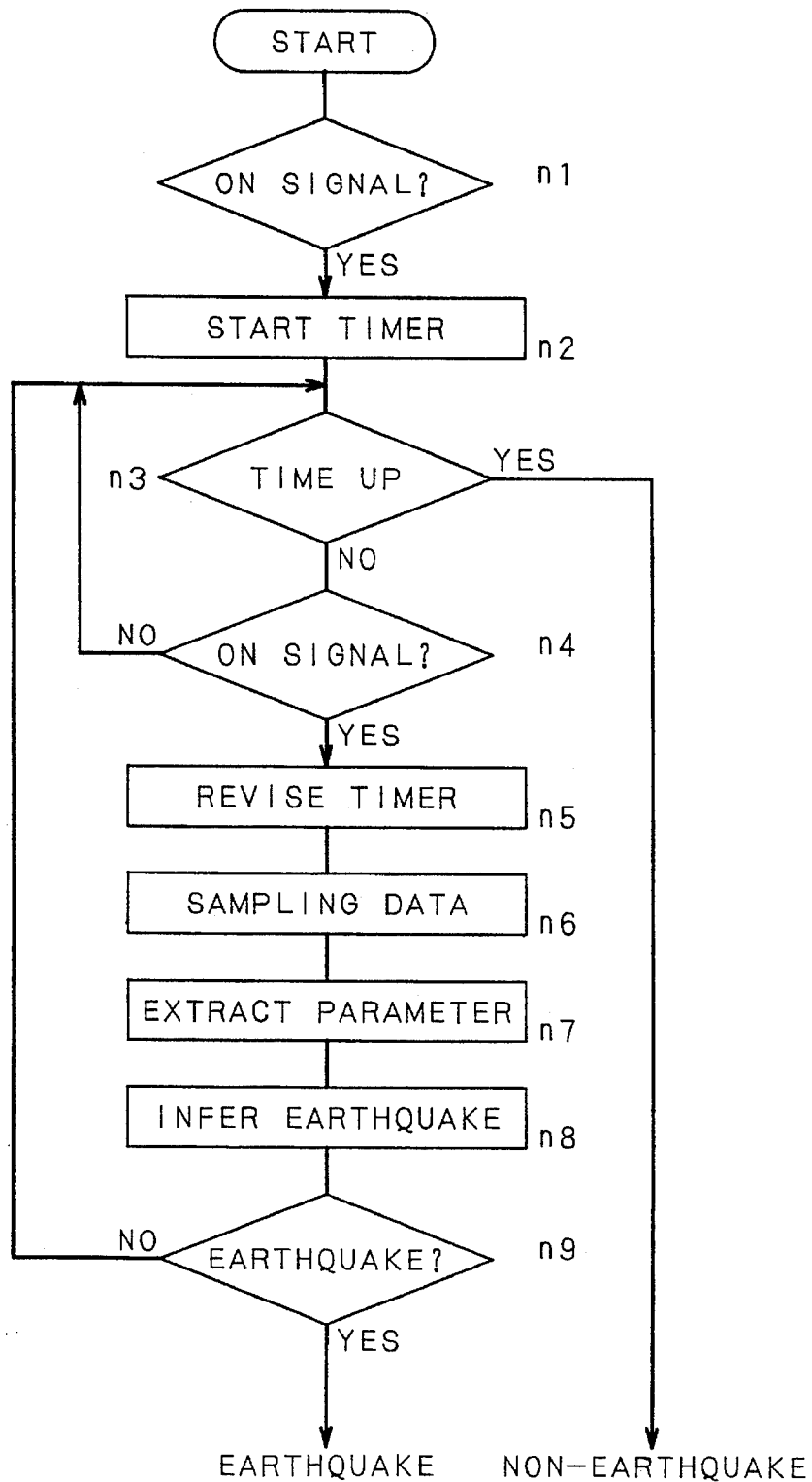
FIG. 5 is a flow chart representing an operation of the device.

An operation of the earthquake discrimination inference device having the above-mentioned construction will be described hereinafter in conjunction with a flow chart of FIG. 5 and a timing chart of FIGS. 6A and 6B.

In this earthquake discrimination inference device, data is sampled to extract the above-mentioned parameters for inference when an ON signal in applied from sensor 2, viz. for each ON period. Whenever an ON signal is applied, characteristic parameters are subsequently revised based on the data produced from the time point of the application of the first ON signal and inference is executed on the revised characteristic parameters. According to this embodiment, in five seconds upon the application of the first ON signal, such data sampling and inference are stopped into a clear status and a process is restarted from the beginning. Moreover, the inference is finished unless any new ON signal is applied within 2.5 seconds from the last ON signal.

When the first ON signal is applied upon turning on sensor 2 (step n1), an YES response is applied to start a timer for the above-mentioned five seconds (step n2). It is inquired if the timer for five seconds or a timor for 2.5 seconds becomes time up (step n3). If it becomes time up, the sequence is finished as non-earthquake is determined. Unless it becomes time up, a NO response is applied to inquire if the sensor makes an ON signal (step n4). If the sensor is turned on and generates an ON signal, the timer for 2.5 seconds is revised (step n5), and data is sampled, for example, at a sampling period of 10 msec or shorter (step n6) to extract the above-mentioned characteristic parameters (step n7) for executing the above-mentioned inference based on the extracted parameters (step n8). Subsequently, it is discriminated if any earthquake exists (step n9). If earthquake exists, an YES response is produced for generating a corresponding discriminated output representing an earthquake. If any earthquake does not exist, the sequency returns to step n3. Based on the discriminated output of earthquake, a cut off valve is closed for cutting off the supply of gas.

Thus, whenever sensor 2 generates an ON signal, data sampling is executed to extract characteristic parameters based on the data produced upon the application of the first ON signal for inference. Accordingly, the discrimination of earthquake of this embodiment is executed at higher speed than discriminating after sampling data from ON/OFF signals from sensor for a predetermined time period, for instance, three seconds.

Moreover, an ON period corresponding to an oscillatory period is employed as a characteristic parameter in view of a prominent period for a seismic wave and shock wave, whereby erroneous discrimination by other shocks than earthquake is reduced. Moreover, an ON period sum total in proportion to an oscillation energy and a maximum ON time value corresponding to the magnitude of oscillation per a half period are employed as characteristic parameters, whereby any dangerous oscillation is detacted.

For experimental evaluation of this device in this embodiment, a gas plumbing of a gas meter housing the earthquake discrimination inference device of this embodiment may be changed about its length and a shock be applied by a bottle ball, or a shock may be applied by knocking a gas cylinder down, whereby it is confirmed that this earthquake discrimination device is very useful because any erroneous discrimination about other shock than earthquake can be avoided.

In this embodiment, the inference is executed based on the three characteristic parameters of an ON period, an ON time sum total and a maximum ON time value. It may be modified by determining an earthquake when at least one of the three characteristic parameters is examined, for instance, when the maximum ON time value becomes long.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. An inference device for discriminating an earthquake, comprising

ON/OFF signal generating means for generating an ON/OFF signal corresponding to an oscillatory wave, wherein the ON/OFF signal is ON when an amplitude of the oscillatory wave differs from a threshold level in a first direction and is otherwise OFF, characteristic parameter extracting means for extracting characteristic parameters including an ON period and an ON time sum total based on the generated ON/OFF signal, and inference means for inferring for each ON period based on the extracted characteristic parameters whether or not said oscillatory wave is generated from an earthquake.

2. An inference device according to claim 1 wherein said inference means infers whether the oscillatory wave is generated from an earthquake by determining whether properties of the characteristic parameters satisfy one or more rules from a set of rules.

3. An inference device for discriminating an earthquake, comprising a sensor for generating an ON/OFF signal corresponding to an oscillatory wave, wherein the ON/OFF signal is ON when an amplitude of the oscillatory wave differs from a threshold level in a first direction and is otherwise OFF, and a microprocessor which includes a characteristic parameter extracting section for extracting at least one of three characteristic parameters consisting of an ON period, an ON time sum total and a maximum ON time value based on the generated ON/OFF signal, and an inference section for inferring for each ON period based on the extracted characteristic parameter whether or not said oscillatory wave is generated from an earthquake.

4. An inference method for discriminating an earthquake, comprising the steps of generating an ON/OFF signal corresponding to an oscillatory wave, wherein the ON/OFF signal is ON when an amplitude of the oscillatory wave differs from a threshold level in a first direction and is otherwise OFF, extracting at least one of three characteristic parameters consisting of an ON period, an ON time sum total and a maximum ON time value based on the generated ON/OFF signal, and inferring for each ON period based on the extracted characteristic parameter whether or not said oscillatory wave is generated from an earthquake.

5. The inference device of claim 1, wherein said characteristic parameter extracting means is operable to extract a maximum ON time value based on the generated ON/OFF signal, and wherein said inference means is operable to infer whether or not said oscillatory wave is generated from an earthquake based on the ON period, the ON time sum total, and the maximum ON time value.

6. A method of inferring whether or not an oscillatory wave is generated from an earthquake, comprising:

generating an ON/OFF signal corresponding to the oscillatory wave, wherein the ON/OFF signal is ON when an amplitude of the oscillatory wave differs from a threshold level in a first direction and is otherwise OFF;

producing at least two characteristic parameters of a set of characteristic parameters consisting of:
  an ON time sum total,
  a maximum ON time value,
  a first count of ON periods having durations shorter than a first threshold value, where the duration of an ON period is calculated from when the ON/OFF signal transitions from OFF to ON until the ON/OFF signal again transitions from OFF to ON,
  a second count of ON periods having durations greater than or equal to the first threshold value and less than a second threshold value, and
  a third count of ON periods having durations greater than or equal to the second threshold value; and inferring for each ON period based on the extracted characteristic parameters whether or not said oscillatory wave is generated from an earthquake.

7. The method of claim 6, wherein the ON/OFF signal is ON when an amplitude of the oscillatory wave exceeds the threshold level and is otherwise OFF.

8. The method of claim 6, wherein said producing step comprises producing said ON time sum total, said first count and said second count, and wherein said inferring step comprises inferring that said oscillatory wave is generated from an earthquake when said ON time sum total is less than a third threshold value, said first count is less than a fourth threshold value, and said second count is greater than a fifth threshold value.

9. The method of claim 8, wherein said producing step further comprises producing said third count, and wherein said inferring step further comprises inferring that said oscillatory wave is generated from an earthquake when said ON time sum total is less than the third threshold value, said first count is less than the fourth threshold value, and said third count is greater than a sixth threshold value.

10. The method of claim 9, wherein said inferring step further comprises inferring that said oscillatory wave is generated from an earthquake when said ON time sum total is greater than or equal to the third threshold value and less than a seventh threshold value and said second count is less than the fifth threshold value.

11. The method of claim 10, wherein said inferring step further comprises inferring that said oscillatory wave is generated from an earthquake when said ON time sum total is greater than or equal to the third threshold value and less than the seventh threshold value, said first count is less than the fourth threshold value, and said second count is greater than or equal to the fifth threshold value.

12. The method of claim 11, wherein said inferring step further comprises inferring that said oscillatory wave is generated from an earthquake when said ON time sum total is greater than the third threshold value and less than the seventh threshold value, said first count is less than a fourth threshold value, and said third count is greater than or equal to the sixth threshold value.

13. The method of claim 12, wherein said inferring step further comprises inferring that said oscillatory wave is generated from an earthquake when said ON time sum total is greater than the seventh threshold value and said third count is greater than the sixth threshold value.

14. The method of claim 13, wherein said producing step further comprises producing said maximum ON time value, and wherein said inferring step comprises inferring that said oscillatory wave is generated from an earthquake when said first count exceeds the fourth threshold value, said second count exceeds the fifth threshold value and said maximum ON time value exceeds an eighth threshold value.

15. The method of claim 6, wherein said producing step comprises producing said ON time sum total, said first count and said third count, and wherein said inferring step comprises inferring that said oscillatory wave is generated from an earthquake when said ON time sum total is less than a third threshold value, said first count is less than a fourth threshold value, and said third count is greater than a fifth threshold value.

16. The method of claim 6, wherein said producing step comprises producing said ON time sum total and said second count, and wherein said inferring step comprises inferring that said oscillatory wave is generated from an earthquake when said ON time sum total is greater than a third threshold value and less than a fourth threshold value and said second count is less than a fifth threshold value.

17. The method of claim 6, wherein said producing step comprises producing said ON time sum total, said first count and said second count, and wherein said inferring step comprises inferring that said oscillatory wave is generated from an earthquake when said ON time sum total is greater than a third threshold value and less than a fourth threshold value, said first count is less than a fifth threshold value, and said second count is greater than a sixth threshold value.

18. The method of claim 6, wherein said producing step comprises producing said ON time sum total, said first count and said third count, and wherein said inferring step comprises inferring that said oscillatory wave is generated from an earthquake when said ON time sum total is greater than a third threshold value and less than a fourth threshold value, said first count is less than a fifth threshold value, and said third count is greater than a sixth threshold value.

19. The method of claim 6, wherein said producing step comprises producing said ON time sum total and said third count, and wherein said inferring step comprises inferring that said oscillatory wave is generated from an earthquake when said ON time sum total is greater than a third threshold value and said third count is greater than a fourth threshold value.

20. The method of claim 6, wherein said producing step comprises producing said first count, said second count and said maximum ON time value, and wherein said inferring step comprises inferring that said oscillatory wave is generated from an earthquake when said first count exceeds a third threshold value, said second count exceeds a fourth threshold value and said maximum ON time value exceeds a fifth threshold value.

* * * * *